May 11, 1943.    R. P. SCHERER    2,318,718
METHOD AND APPARATUS OF FABRICATING FILLED CAPSULES
Filed Dec. 5, 1939    4 Sheets-Sheet 1
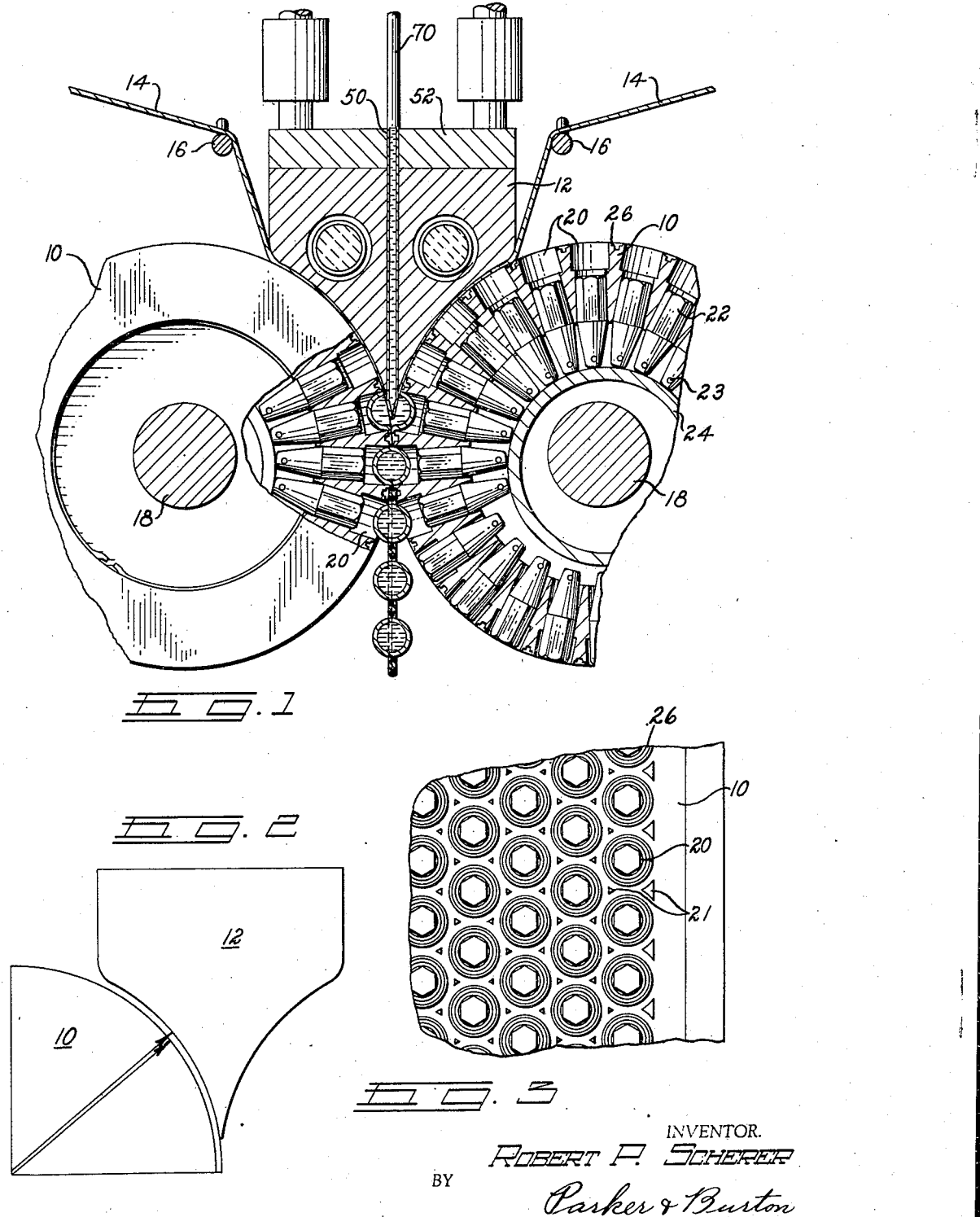
INVENTOR.
Robert P. Scherer
BY
Parker & Burton
ATTORNEYS.

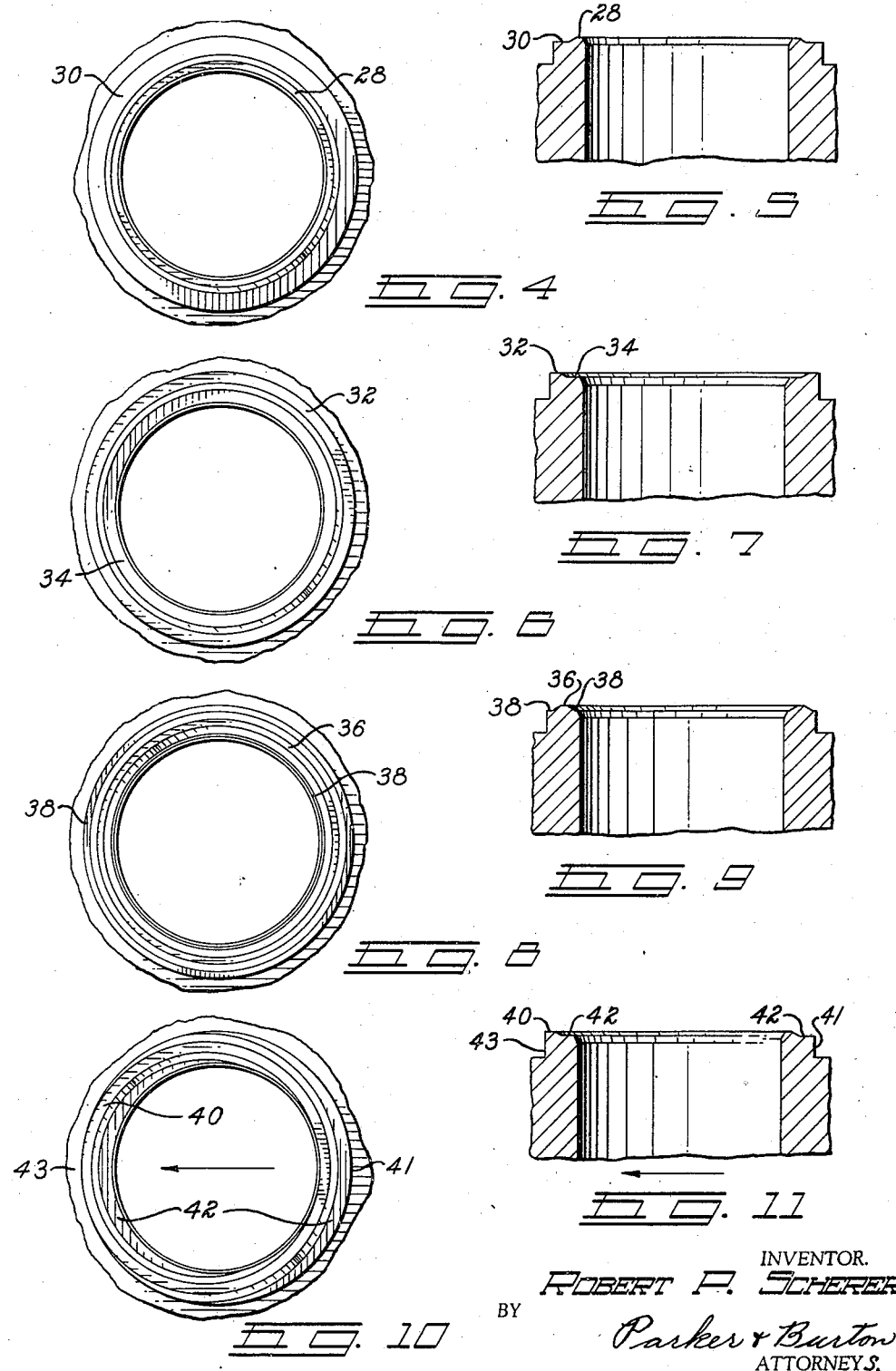

May 11, 1943.     R. P. SCHERER     2,318,718
METHOD AND APPARATUS OF FABRICATING FILLED CAPSULES
Filed Dec. 5, 1939     4 Sheets-Sheet 3
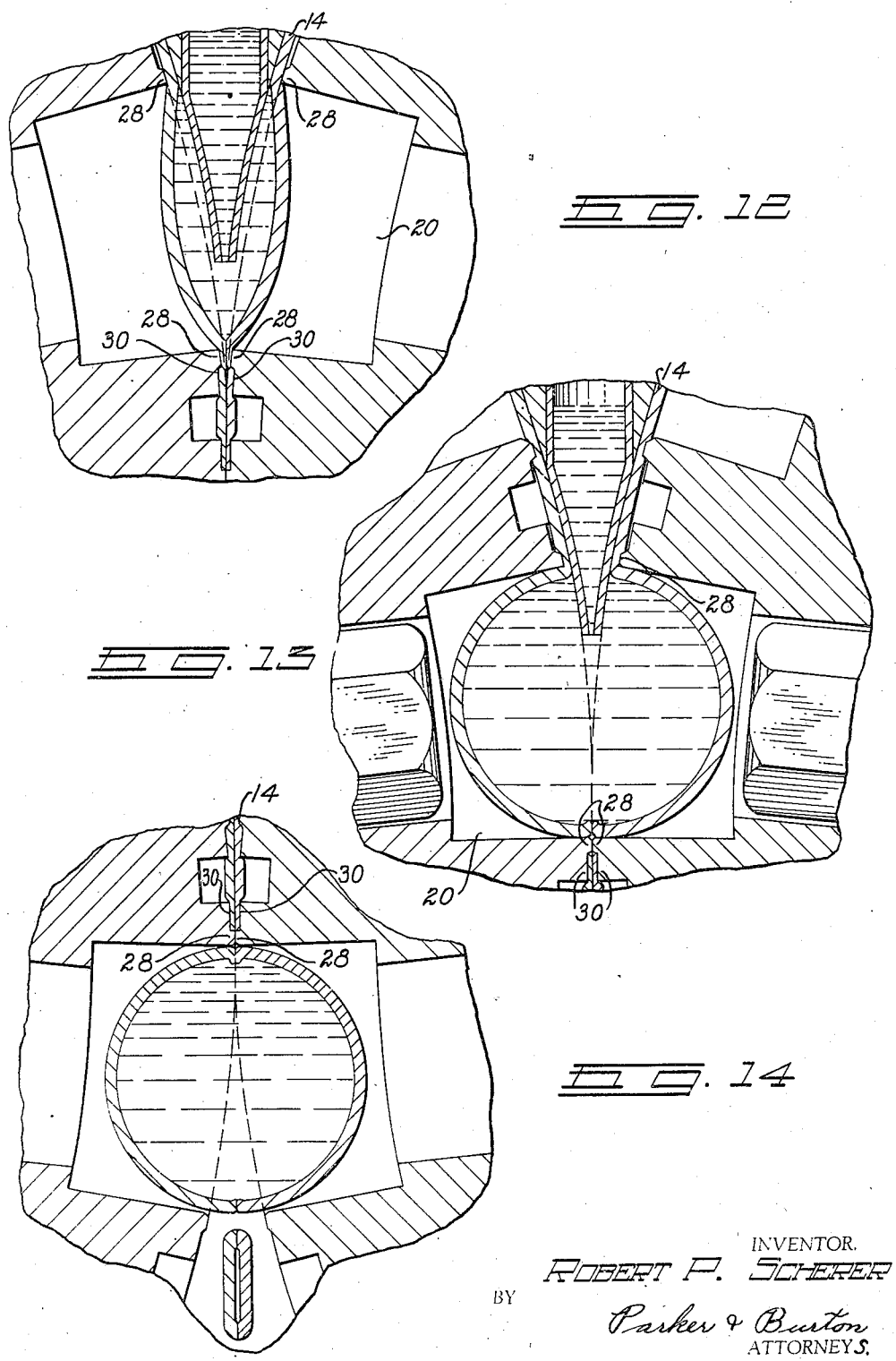
INVENTOR.
Robert P. Scherer
BY Parker & Burton
ATTORNEYS.

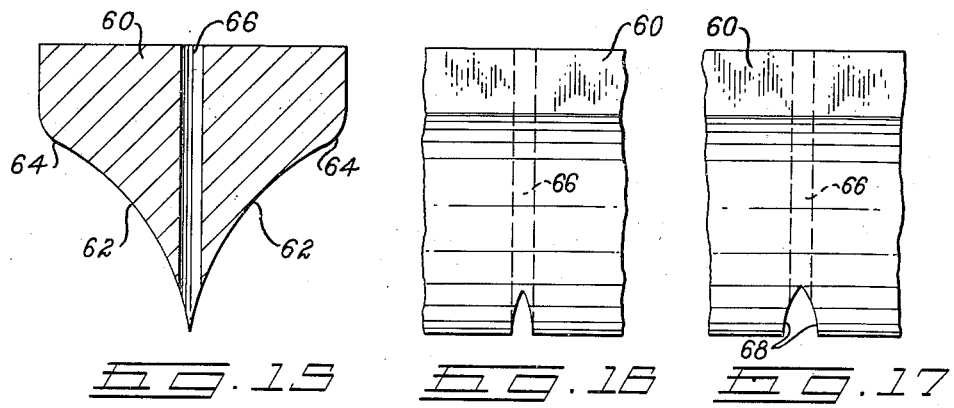
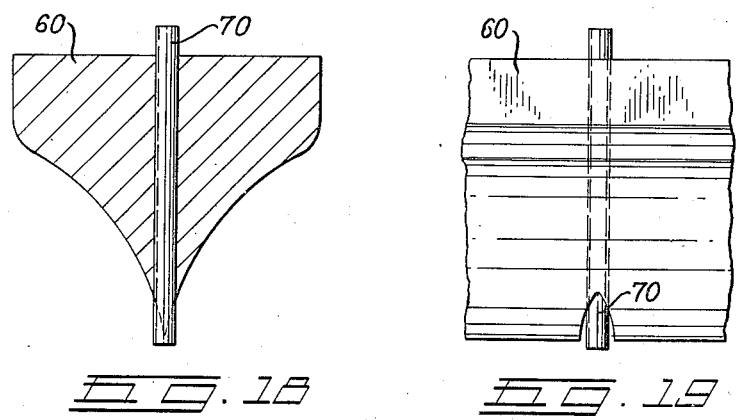
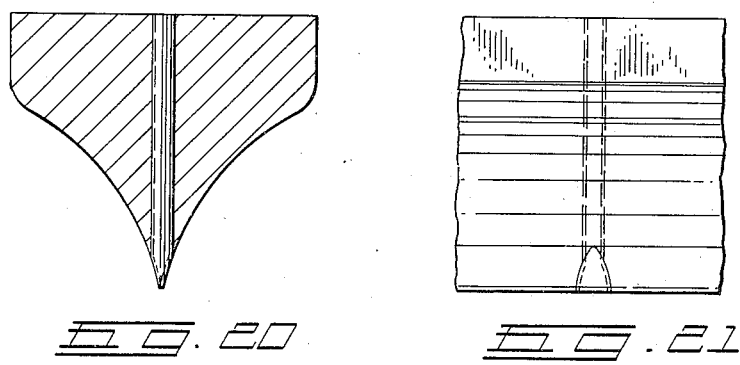

Patented May 11, 1943

2,318,718

UNITED STATES PATENT OFFICE 2,318,718

METHOD AND APPARATUS OF FABRICATING FILLED CAPSULES

Robert P. Scherer, Detroit, Mich.

Application December 5, 1939, Serial No. 307,666

24 Claims. (Cl. 18—21)

This invention relates to improvements in the method of and apparatus for forming and filling capsules.

Heretofore it has been the practice to form capsules from sheets or bands of plastic material, usually gelatinous in character, between which filler material is introduced. The sheets or bands of capsule forming material are subjected to the pressure of die members which seal the sheet material around the filler substance and at the same time substantially sever the capsule bodies from the sheet material. In the past the cooperating die members generally had either flat die faces or curved die faces in which a plurality of die cavities or pockets were formed. In the former case the plates were brought together perpendicularly to one another upon opposite sides of two capsule forming sheets between which filler substance had been spread. In the latter case, rotating die rolls were mounted upon spaced parallel axes and two bands or ribbons of capsule forming material were continuously fed between the die rolls and filler material injected between the bands adjacent the point where the die rolls met to form the capsules.

An important object of this invention is to provide a novel method of and apparatus for forming capsules between die members of either the flat plate or roll variety which improves the seal of each capsule so that there is less breakage, increases the accuracy of the shape and seal of capsules formed, and increases the number of capsules produced per unit area of die surface. Furthermore, the present invention reduces the percent of wastage of capsules heretofore encountered in the manufacture of capsules. The novelty improves both the cutting action of the die members as they sever the capsule bodies from the sheet material and the seal of the capsules formed. Moreover, the capsules produced by this method and apparatus are more uniform, have a better appearance and feel and the sealed portions are stronger and firmer than those heretofore produced.

Another object of this invention is to provide improved mechanism for shaping and filling the capsules which increases the accuracy of the dosages capsulated and reduces to a minimum any possibility of filler substances escaping from the capsules as they are formed or of air entering the capsules during formation. Wastage of content material in the web is also minimized.

The improved mechanism includes a novel form of feeder head or segment constructed so that the filler material is discharged through the thin edge or apex formed by two converging side walls of the segment and between ribbons or bands of capsule forming material brought together as they pass between two rotating die rolls. The feeder head is so constructed and mounted relative to the die rolls that it has a universal floating movement upon the bands causing them to be tightly pressed against the curved faces of the die rolls.

Another feature of importance is the novel relation of the converging side faces of the feeder head to the die rolls. The feeder head is so constructed that the path between the feeder head and each die roll, through which the bands or ribbon of capsule forming material is fed, gradually contracts in width so that an increasingly greater pressure is brought to bear on the band as it approaches the thin edge of the feeder head. As a result, a strong seal against the entrance of air or escape of filler substance is provided.

Another important object of this invention is to provide a novel method of making a feeder head or segment of the type described above for injecting controlled regulated amounts of capsule filler material into the capsules. This method of manufacture results in the production of an improved type of feeder head having narrow discharge slits along the thin edge or apex thereof through which discharge thin streams of filler substances deep inside the capsules at the time they are formed.

Various other objects, advantages and meritorious features of this invention will become more fully apparent from the following specification, appended claims and accompanying drawings, wherein:

Figure 1 is a sectional view through the die members and feeder head showing the manner of forming capsules, Fig. 2 is a diagrammatic view showing the relationship of the feeder head to the die rolls, Fig. 3 is a view showing the pattern of the capsule forming pockets or cavities on the working face of the die members, Figs. 4 and 5 are plan views and cross-sectional views, respectively, of one form of die cavity having the cutting section of the wall or ledge adjacent the rim of the cavity, Figs. 6 and 7 are plan and cross-sectional views, respectively, of another form of die cavity having the cutting section of the ledge spaced from the rim of the cavity, Figs. 8 and 9 are plan and cross-sectional views, respectively, of another form of die cavity having the cutting section of the ledge arranged between sealing sections, Figs. 10 and 11 are plan and cross-sectional views, respectively, of another form of die cavity having the cutting section of the ledge so related to the rim of the die cavity that the leading edge is spaced from the rim but that the trailing edge is adjacent the rim of the cavity, Figs. 12, 13 and 14 are enlarged sectional views of the die rolls showing the successive step in the production of a capsule in accordance with this invention and the manner in which the die cavities function to seal and sever the capsule body from the bands of capsule forming material, Figs. 15 and 16 are cross-sectional and side views, respectively, of the feeder head showing the first step in the formation of the delivery passage, Fig. 17 is a view similar to Fig. 16 but after the opening of the passage in the edge or apex of the head has been enlarged, Figs. 18 and 19 are cross-sectional and side views, respectively, of the feeder head after the delivery tube has been inserted, and Figs. 20 and 21 are cross-sectional and side views, respectively, of the feeder head after the end of the delivery tube in the apex of the feeder head has been compressed to form a narrow discharge slit.

The feature of the invention relating to the construction and operation of the die cavities or pockets is applicable to flat or round die members, the method described herein of sealing and severing capsules being applicable to both types of die members.

Referring in detail to the drawings, I have shown in Fig. 1 two die members 10—10 of the roll type provided on their faces with a plurality of die cavities or pockets in which the capsules are formed, filled, sealed and severed. Superimposing these die rolls is a feeder head 12 having converging side faces tapering to a thin edge or apex which enters between the die rolls as shown. This arrangement in general is similar to that illustrated in my application for patent, Serial No. 44,017, filed October 8, 1935, but differs in several important respects as will be more particularly pointed out hereinafter.

Two bands or ribbons 14—14 of capsule forming material, such as a gelatinous plastic substance, are fed between the die rolls. The two bands are delivered from opposite sides of the machine and directed over guides 16—16 mounted above the die rolls. From thence the bands pass between the converging side walls of the feeder head and the die rolls and thence between the die rolls and on out to the other side. The converging sides of the feeder head have a concave curvature conforming in general to the curved faces of the die rolls but specifically there is a slight variation in these two curved elements for the purpose of obtaining a better seal as will be described more particularly hereinafter.

Each die roll is mounted on a shaft 18. Each die roll is provided with a plurality of die cavities or pockets which correspond in number, shape and position on the two die rolls. The die rolls are mounted on their respective driving shafts so that when rotated in opposite directions at the same speed the cavities 20 on one die roll align themselves opposite a cavity in the other roll when they pass through the plane intersecting the axes of the rolls.

In each cavity a plunger 22 is disposed which is free to reciprocate longitudinally therein as it is urged by gravity. Each row of plungers is parallel to the axis of the die roll. The several plungers on each row are connected together for joint reciprocal movement by a pin 23 extending through the inner ends of the plungers. Within each die roll is a sleeve 24 having a limited radial play. Each sleeve 24 acts as a cam in its respective die roll and urges all the plungers 22 outwardly as they swing below the center of the die roll. This outward movement of the plungers clears the cavity in which it reciprocates of material left therein during capsule forming operation including the capsule body which might otherwise try to stick therein.

The die cavities or pockets are spatially arranged in such a way upon the die rolls that they contribute to the die cutting and sealing operation in a distinctly novel way. They are crowded close together in parallel rows with the cavities in one row being staggered with respect to the cavities in adjacent rows. The pattern formed by the die cavities is like that shown in Fig. 2. The space between the die cavities is relatively small and the cavities occupy the maximum area of the die face consistent with shape and size of capsules formed. The important function of this arrangement will be more particularly described hereinafter.

It has been found in practice that there is a sensitive relationship between the positions of the die cavities, the thicknesses of the plastic sheets or bands 14—14, and the formation of the cutting and sealing edges surrounding the die cavities. The closer the cavities are placed to one another the less tendency there is of forming secondary tubular structures in the bands between the capsules. Moreover, stronger and better sealed capsules are produced when the cavities are close together. There is a limit however, to the extent that the cavities can be brought close together. When too close, the bands buckle and bulge in the areas between the cavities and this interferes with the production of accurately filled and well formed capsules. To prevent the formation of tubular structures or secondary capsules in the spaces between the capsule cavities small elevations or islands are provided as described and claimed in my copending application Ser. No. 44,017.

It was also discovered that if the squeezing out action of the plastic bands under pressure of the cutting edge and away from the capsule being formed was opposed or resisted within controlled limits, a better seal around the capsule resulted. By bringing the cavities close together the cutting edges around the cavities assisted in this regard because the squeezing out of band material from the cutting edge about one capsule cavity set up a pressure opposing the squeezing out of band material from the cutting edge about an adjacent capsule cavity. The islands referred to also assisted in this regard as well as in supporting the band against falling toward the roll surface between the cavities.

A most important feature contributing to this improvement in the severing and sealing operation is the provision of a new form of cutting wall or ledge surrounding each cavity. Heretofore these walls or ledges have been flat and of relatively wide width. Such a ledge produced a relatively wide seal but tended toward raggedness or fringing of the edge of the seal. To avoid this fringing tendency applicant went to a narrow ledge. A narrow ledge produced a clean seal but the tendency to narrowness needed to be carefully controlled to insure a good seal. Too narrow a cutting face on the ledge resulted in a weak, though clean, seal. Each of these forms therefore had its advantages and disadvantages.

In the present instance, the advantage of the clean cut seal of the narrow cutting edge is retained by providing a narrow flat cutting face. The effectiveness of the seal is obtained by providing a ledge or ridge which is provided with sealing portions in addition to the narrow cutting edge portion. In the new form described in detail hereinafter, the ledges or ridges are stepped or have faces at different levels. The highest face or section of the ledge serves as a cutting edge. The next lower level face or section of the ledge exerts a pressure normal to the sheet or band material compressing the same without severing it. This compression adjacent the line of severance also aids in opposing the squeezing out tendency of the plastic band material as hereinafter appears.

Around each cavity there is provided a wall or ledge 26 which serves to cut the capsule body from the bands 14 and seal the same in one operation. Each wall or ledge is stepped or divided peripherally into two or more sections at different levels above the face of the die member. The higher section of the ledge serves as a cutting edge, the lower section serves to exert a pressure on the plastic sheets or strips without severing the same. The cutting section of each ledge cooperates with a similar section of ledge on the complementary die member which ledges abut one another at the conclusion of their severing operation. The lower or pressure exerting section of each ledge cooperates with a corresponding section on the corresponding ledge of the opposing die member, which ledges between them compress portions of the plastic sheets without cutting completely through the same but resisting flow outwardly away from the cutting ledge of the band material. The elevation between the levels of the cutting and pressure sections of each die should not be more than the thickness of a band acted upon in order to cooperate with similarly disposed sections on the opposing die member and exert a pressure on the two juxtaposed bands.

In Figs. 4 to 11, inclusive, four alternative ways of constructing the stepped wall, ridge or ledge 26 is shown. In Figs. 4 and 5 the cutting section of the ledge is indicated at 28 adjacent to the edge of the cavity. Surrounding this section is the pressure exerting sections 30 at a level a little lower than the cutting edge as shown. The distance separating the levels of these two sections should be less than the thickness of the plastic band upon which they act. Preferably the side of the highest or cutting section should be chamfered or bevelled in the manner indicated to obtain the best results. As previously explained, the ledges surrounding each die cavity on the one die member align with ledges surrounding corresponding die cavities on the opposing die member. In the capsule forming operation the cutting sections 28 of opposed die cavities abut one another to completely sever the two juxtaposed bands of plastic material while the sections 30 of opposed die cavities compress such bands together.

By virtue of the bevel face between the pressure ledge and the cutting ledge and the provision of a relatively narrow flat cutting face on the cutting ledge, the gelatin bands are gripped securely between the die members and the pressure upon the bands to effect a seal is substantially high prior to the cutting or rupturing of the bands. If there were no bevel edges the flattened cutting faces, if too narrow, would cut through the gelatin band without producing a perfect seal. If the flattened cutting edges were too wide they would tend, as they come together, to squeeze some of the gelatin out from between them and rupture of the gelatin between such faces might result, producing a ragged or fringed seal. In other words, a better thermo pressure seal is provided as a result of the provision of the bevel edges which grip the gelatin and restrain its flowing away from the flat narrow cutting edges and produce an effective seal while the flat faces sever the gelatin.

In Figs. 6 and 7, the stepped character of the ledge or ridge 26 is the reverse of that in Figs. 4 and 5. Instead of the cutting section being disposed on the edge of the cavity it is spaced from the cavity and the pressure exerting portion appears between it and the rim of the cavity. In these figures the cutting section of the ledge is indicated at 32, the pressure section at 34.

In Figs. 8 and 9, the cutting section of the ledge or ridge is disposed centrally between two lower circular sections acting as pressure exerting faces on the plastic sheet material. The cutting or severing section of the ledge in this form of the invention is indicated at 36, the pressure exerting sections at 38—38.

The form of ledge construction in Figs. 10 and 11 is particularly adapted for die roll members of the type shown in Fig. 1. In said die members, opposed ledges do not contact or function together simultaneously throughout their length, but gradually as the ledges approach one another and turn away from one another. As a result one side of each opposing ledge first comes into action before any other side. This portion of the ledge is designated the leading edge. The last portion of each of the ledges of a pair coming into operation is termed the trailing edge. The action of the leading and trailing edges upon the plastic material differs. It has been found that a better sealed capsule is produced in many instances when the higher or leading section 43 of the ledge is separated from the rim of the cavity by a lower pressure exerting section. The reverse is true in many instances insofar as the trailing edge 41 is concerned. There it has been found that a better sealed capsule is obtained if this cutting section of the ledge is disposed on the rim of the cavity.

To obtain both desired results, the novel form of ledge or ridge construction in Figs. 10 and 11 is preferred. As shown, the cutting section 40 of the ledge is formed eccentric to the cavity so that on one side it is spaced a maximum distance from the rim of the cavity and on the other side it is right adjacent the rim of the cavity. On one side or the other side, or on both sides, depending on the position of the eccentric cutting edge there is a pressure section 42 at a slightly lower level than the cutting edge which, like the previously described pressure faces 30, 34 and 38, exert a perpendicular pressure on the plastic bands of capsule forming material. At points 90° from the extreme positions of the higher section 40, the ledge extends substantially equidistant between the rim of the cavity and the outside edge of the ledge. The construction at this point is similar to that in Figs. 8 and 9. The arrows in Figs. 10 and 11 indicate the direction of rotation of cavities. When rotating in this manner the left side of the ledge constitutes the leading edge and the right side the trailing edge. Although in many instances it is preferred to have the leading and trailing edges arranged as shown with respect to the direction of travel of the die rolls, it might be preferable in certain instances to reverse the position of the cutting section 40 with respect to the cavity and the direction of rotation.

The formation of the stepped character of the ledges or ridges surrounding the cavities is clearly illustrated in the enlarged detail of Figs. 12, 13 and 14. The form of ledge in Figs. 4 and 5 on rotating die rolls is used to illustrate the action but it is understood that the other ledges function in a similar way. As the two die rolls rotate in opposite directions they exert a force drawing the two plastic bands 14—14 of capsule forming material past the concave sides of the feeder head 12 and between the die rolls. The leading edges of each pair of opposing cavities are the first to act upon the bands and commence the severing sealing action as the bands are distended by the filler material to form the capsule. As shown in the lower portion of Fig. 12 the steps of the ledge are already entering the bands as the capsule is initially distended by the injection of the filling substance from the feeder head. The cutting sections 28—28 of the opposing ledges are not in abutment and the bands have not as yet been severed at this point. The sections 30—30 of the opposing ledges are already exerting a perpendicular pressure upon the bands compressing and squeezing the same at this point and securely clamping the same while the adjacent cutting edges penetrate deeper into the bands. This clamping action sets up a pressure in the bands opposing the squeezing out pressure created by the cutting sections 28—28.

Fig. 13 represents another step in the progress of forming a capsule. The cutting sections 28—28 on the leading edge are now in abutment completely severing thru the two bands of capsule forming material. The two pressure exerting sections 30—30 continue their clamping action. As the rolls continue to rotate more and more portions of the capsule will be severed and sealed from the surrounding sheet material. In the position of the die rolls in Fig. 13, the cutting sections 28—28 along the trailing edge are now commencing to enter the bands. The capsule has almost assumed its finished shape. In Fig. 14 the die rolls have rotated sufficiently far enough so that the cutting sections 28—28 along the trailing edge now abut, thus severing the bands at this point. The sections 30—30 of the ledge perform the function of clamping and compressing the bands adjacent the severing action thus improving the seal of the capsule.

As previously described, the feeder head 12 is constructed in a novel way to inject fluid substances directly from the apex of the feeder head into the heart of the capsule as it is formed. The three figures, 12, 13 and 14 previously described, depict the operation of the feeder head as it injects filler material between the bands 14—14 to distort them into capsules. Referring to Fig. 1 the feeder head 12 is drilled or otherwise formed with one or more passages 50 extending from the top side and opening out through the apex. In each passage a tube 70 is disposed. The lower end of each tube is crimped to form a narrow slit extending in alignment with the apex of the feeder head. The opposite ends of the tubes project above the feeder head and through a supporting block 52 to which the feeder head is attached. The tubes are flexible in their extension away from the feeder head to permit free flotation. The block 52 and feeder head 12 are mounted for limited universal movement so that the feeder head floats on the converging portions of the band 14—14 shifting up or down or to the side and even turning or tilting slightly to adjust itself to any irregularity in band thickness. This feature is described and claimed in by copending application Serial No. 44,017.

The feeder head is formed in a novel manner. The various steps in its manufacture are shown in Figs. 15 to 21, inclusive. An elongated metal block 60 is first shaped by under-cutting to provide concave side faces 62—62 converging to a common edge or apex as shown. The shoulders 64—64 meet at the point where the concave faces meet the original sides of the block. This is important because the bands 14—14 are drawn under slight tension around these shoulders before passing between the die rolls. The feeder head block is then drilled with one or more passages 66 from the top side through to the common edge or apex. The mouths of the passages opening through the apex of the block are now widened slightly in the manner shown at 68 in Fig. 17. Figs. 15, 16 and 17 show the condition of the block after these operations.

Tubes of readily deformable material are inserted in the passages 66. One such tube is shown at 70 in Fig. 18. The opposite ends of the tube project beyond the block. Preferably only a small portion of the tube projects beyond the apex as indicated in Figs. 18 and 19. A small thin shim is then placed in the apex end of each tube and arranged so that it extends in the direction of the apex. The tubes are now crimped down until the side walls of the tube at the widened mouth of the passage 66 assume the curvature of the side walls 62—62. At the same time the side walls of the tube at this point spread laterally to fill the wide mouth of the passage as indicated in Fig. 21. The shim prevents the walls of the tube from entirely collapsing upon one another so that there is left, upon removal of the shim, a slight clearance in the form of a narrow slit between the flattened sides of the tube. This slit is in alignment with the edge or apex and extends substantially the width of the mouth of the passage. In use, filler substances are fed down the tubes 70 and out through the narrow slits in the bottom ends thereof. The filler substances are preferably urged through the tubes under intermittent pressure operating in time relationship to the rotation of the die rolls and the position of the die cavities thereon. The enlarged detail views in Figs. 12, 13 and 14 show the successive steps in the formation of a capsule using a feeder head of the type described.

What I claim:

1. That method of forming filled capsules which comprises compressing, sealing, and severing corresponding portions of two sheets of capsule forming material having capsule filling material therebetween along a line enclosing capsule filling material and simultaneously exerting opposing forces perpendicular to the plane of said sheets adjacent the portions being severed and compressing the sheet material without severing the same.

2. The method of forming capsules which comprises cutting through two sheets of plastic capsule shell forming material along a line encircling corresponding portions of the two sheets having capsule filler material therebetween, and sealing the same together along and adjacent to said line by simultaneously applying pressure perpendicularly against the opposite sides of said sheets along and adjacent to said line to set up a force in the sheets resisting the flow of sheet material away from the portions subjected to the cutting operation.

3. Capsule forming mechanism comprising, in combination, opposing die members provided with cutting edges which penetrate completely through capsule forming sheet material and abut one another to sever the sheet material, said die members in addition provided with surfaces adjacent said edges which compress but do not penetrate completely through the sheet material as the edges perform their cutting operation.

4. A die member for operating upon a sheet of capsule forming material, said die member having a face provided with a cavity of the shape of the capsule body to be formed, said face provided with a protruding ledge surrounding the cavity, said ledge comprising two peripheral sections different distances from the face, the difference in the distances of protrusion of said two sections being less than the thickness of the sheet of capsule forming material upon which the die is to operate.

5. A die member for operating upon a sheet of capsule forming material, said die member having a face provided with a cavity of the shape of the capsule body to be formed, said face provided with a protruding ledge surrounding the cavity, said ledge comprising two peripheral sections different distances from the face, a beveled face inclining downwardly from the section at the greatest distance from said face to the section nearer to the face, the difference in the distances of protrusion of said sections being not more than the thickness of the sheet of capsule forming material.

6. A die member for forming capsules out of sheet material positioned thereover comprising a body having a cavity opening out through the working face thereof, said body provided with a protruding ledge surrounding the cavity, said ledge comprising two peripheral sections at different distances from the working face of the die member, the peripheral section at the greatest distance from the working face adapted to abut a corresponding section of a ledge on an opposing die member during the capsule forming operation and sever the sheet material, the other peripheral section adapted to cooperate with a corresponding section on the ledge of the opposing die member and compress the sheet material therebetween without severing the same.

7. Capsule forming mechanism comprising, in combination, a pair of opposed die members each having a plurality of correspondingly shaped cavities opening out through the working face, each cavity provided with a surrounding protruding ledge, the ledges of corresponding cavities on the die members being similarly formed, each ledge provided with a cavity surrounding surface portion adapted to abut a similar formed surface portion of the corresponding ledge of the opposed die member to substantially sever capsule forming sheet material interposed between the die members, each ledge provided with an encircling surface portion at a nearer level to the working face and outwardly beyond said first mentioned surface portion away from the cavity and adapted to cooperate with a similar nearer surface portion on the opposed ledge of the other die member by engaging and compressing the capsule sheet material interposed between the die members but without severing the same.

8. Capsule forming mechanism comprising, in combination, a pair of opposed die members between which is adapted to be positioned two sheets of material for forming the outer shells of capsules, said die members each provided with a plurality of correspondingly shaped cavities opening out through their working faces and adapted to register in the capsule forming operation, ledges surrounding the cavities, each ledge comprising a plurality of peripheral sections at unequal distances above the working face of the die member, corresponding sections of opposing ledges at the greatest distance from said working face adapted to abut one another and substantially sever the two sheets of shell forming material interposed between the die members, corresponding sections of opposing ledges at the next greatest distance from the working face adapted when abutment of said first described sections occurs to be separated from one another at a distance which is less than the combined thickness of the two sheets of shell forming material and thereby exert a pressure thereupon as adjacent portions of the sheets are severed by said abutting sections of the ledges.

9. A die member comprising a body having a plurality of cavities in its working face, said cavities arranged in rows wherein the several cavities in one row are staggered with respect to the cavities of an adjacent row and crowded closely together so that as large a portion as possible of the area of the working face is occupied by the cavities, said cavities each surrounded by a protruding ledge raised above the working face of the die member, and elevations within the face area between the rows spaced from the ledges about the cavities and extending to a distance from the working face substantially equal to that of the ledges.

10. A die member comprising a body having a plurality of cavities in its working face, said cavities arranged in rows wherein the several cavities in one row are staggered with respect to the cavities of an adjacent row and crowded closely together, each cavity encircled by a ledge raised above the face of the die, and elevations in the spaces on the working face between the cavities spaced on all sides substantially equidistant from the ledges around the cavities, said elevations raised above the working face a distance substantially equal to that of the ledges.

11. A die member for forming capsules having a plurality of cavities in its working face, a narrow ledge surrounding each cavity and elevated above said working face, said cavities crowded closely together in rows but offset in staggered relationship, the face of the die member between three adjacent die cavities considered as a group being provided with an elevation rising a distance from the face substantially equal to the distance of the ledges above the face and located substantially equidistantly therefrom.

12. Capsule forming mechanism comprising, in combination, a pair of die rolls mounted on parallel axes, a feeder head for delivering filler substance to the capsules being formed, said head having two side faces converging to a common edge, said feeder head mounted with said edge entering the narrowing space between the die rolls, means for feeding bands of plastic capsule forming material between the die rolls and said faces of the feeder head, said two converging faces of said feeder head having a concave curvature conforming generally to the curvature of the die rolls so that the faces may press the bands into close contact with the die rolls as they converge together therebetween, the center of curvature of each concave face on the feeder head being slightly offset with respect to the axis of the die roll against which it presses the band of capsule forming material in such that a direction that the space between the die roll and feeder head tapers gradually to a minimum distance at said edge of the feeder head whereby the feeder head exerts a gradually increasing pressure on the band fed through said last mentioned space.

13. Capsule forming mechanism comprising, in combination, a pair of die rolls mounted for rotation about parallel axes, a feeder head having opposite side faces converging to a relatively thin common edge and arranged with the thin edge entering into the narrowing space between the rolls, means for feeding a band of capsule forming material between each converging face of the feeder head and its die roll, the converging faces of said feeder head each being curved to conform generally to the periphery of its cooperating die roll in such a manner as to provide a curved space between each face and its die roll which narrows progressively toward said edge.

14. Capsule forming mechanism comprising a pair of cooperating rotatable die rolls each provided with a circular series of die cavities adapted to successively register with those on the other roll upon rotation of the rolls, a feeder head having converging sides terminating in a common relatively thin edge and so mounted that the edge extends between the die rolls, means for delivering two bands of capsule shell forming material between the die rolls with one band entering on each of the opposite converging sides of the feeder head, said feeder head provided with a passageway opening out through said edge of the feeder head in the form of a narrow discharge slit which is in line with said series of die cavities.

15. Capsule forming mechanism comprising a pair of cooperating rotatable die rolls each provided with circumferentially spaced apart die cavities adapted to successively register with those on the other roll as the rolls rotate, a feeder head having opposite side faces converging to a relatively thin edge and having a curvature corresponding substantially to that of the periphery of the rolls, means mounting said feeder head for floating movement with the thin edge entering the converging space between the rolls, said feeder head provided with a passageway therethrough for delivery of capsule filling substance, said passageway opening out through the thin edge and shaped to deliver the filling substance in a flat thin stream substantially in line with and through the thin edge of the feeder head.

16. Capsule forming mechanism comprising a pair of cooperating rotatable members each provided with a plurality of corresponding capsule forming dies adapted to come successively into registration with the dies of the other member as said members rotate, means for delivering two bands of shell forming material over said pair of members in converging paths and thence between said members, a filler material feeding head having opposite side faces converging to a common relatively thin edge, said head positioned between the converging sections of said bands with the thin edge thereof entering the converging space between the bands, and one or more discharge passages in said head opening out through said thin edge at such positions along the edge as to register with the dies on said rotating members and forming orifices through which capsule filler material is discharged between the bands.

17. A die member for acting upon plastic sheet material having a working face provided with a raised wall projecting therefrom having its upper surface adapted to engage and cut through sheet material, and a projection on said face adjacent to said wall rising from said working face a distance less than the wall but sufficient to exert a pressure on the sheet material upon which the wall is acting but without completely severing the sheet material.

18. A die member for acting upon plastic sheet material having a working face provided with a raised wall projecting therefrom having its upper surface adapted to engage and cut through sheet material, and a projection on said face adjacent to said wall rising from said working face a distance less than the wall but sufficient to exert a pressure on the sheet material upon which the wall is acting but without completely severing the sheet material, said projection having its upper surface extending substantially parallel to the plane of the sheet material upon which said wall is acting.

19. A die member for acting upon plastic sheet material comprising a die wall having a cutting surface adapted to engage and cut through the sheet material, and one or more surfaces adjacent said cutting surface at such a level with respect thereto as to engage said sheet material and exert a pressure on the sheet material without completely severing the same during the cutting operation performed by the cutting surface on the sheet material.

20. Cooperating die members for acting upon opposite sides of two or more sheets of plastic material, said die members having opposed corresponding cutting surfaces adapted to completely cut through said sheets and abut one another and simultaneously seal the sheets together along the line of severance, said die members having opposed corresponding surfaces adjacent to said cutting surfaces at such a level with respect thereto and to the combined thicknesses of said sheets as to grip the sheets together without completely cutting therethrough during the cutting and sealing operation performed by said cutting surfaces.

21. A die member for operating upon a sheet of capsule forming material, said die member having a face provided with a cavity generally of the shape of the capsule to be formed, said face of the die member provided with a protruding ledge surmounting the cavity, said ledge having two peripheral sections at different distances from the face of the die member, the difference in the distances of protrusion of said sections being no more than the thickness of the sheet of capsule forming material upon which the die is to operate, the peripheral sections alternating in position with respect to the cavity, the section at the greatest distance from the face being on the side immediately adjacent to the cavity for a part of the distance around the cavity and the section at the least distance from the face being on the side immediately adjacent the cavity for the balance of the distance around the cavity.

22. The die member defined in claim numbered 17 characterized in that said working face is provided with a capsule forming cavity, and said raised wall encircles said cavity, and said projection encircles said wall and is connected therewith by an intervening beveled face encircling said wall.

23. The die member defined in claim numbered 17 characterized in that said die member is in the form of a rotatably supported roll, and said working face is the peripheral face of the roll, and said working face is provided with a capsule forming cavity, and said raised wall is in the form of a ledge which encircles said cavity.

24. The die member defined in claim numbered 17 characterized in that said die member is in the form of a rotatably supported roll, and said working face is the peripheral face of the roll, and said working face is provided with a capsule forming cavity, and said raised wall is in the form of a ledge which encircles said cavity, and said projection is in the form of a ledge which encircles said raised wall.

ROBERT P. SCHERER.